United States Patent [19]

Farris

[11] Patent Number: 5,489,444

[45] Date of Patent: Feb. 6, 1996

[54] PROCESS FOR PREPARING POTATO PRODUCT WITH SECURED HANDLING STICK

[76] Inventor: Weston D. Farris, P.O. Box 9, Glenns Ferry, Id. 83623

[21] Appl. No.: 393,551

[22] Filed: Feb. 23, 1995

Related U.S. Application Data

[63] Continuation-in-part of Ser. No. 191,628, Feb. 4, 1994, abandoned.

[51] Int. Cl.6 .................................................. A23L 1/216
[52] U.S. Cl. ........................ 426/421; 426/104; 426/134; 426/509; 426/523; 426/637
[58] Field of Search .................................... 426/134, 637, 426/91, 481, 482, 104, 420, 421, 509, 510, 523

[56] References Cited

U.S. PATENT DOCUMENTS

| | | | |
|---|---|---|---|
| 2,963,147 | 12/1960 | Stagner | 426/134 |
| 4,139,644 | 2/1979 | Stephenson | 426/134 |
| 4,144,356 | 3/1979 | McDaniel | 426/91 |
| 4,194,016 | 3/1980 | Weaver et al. | 426/509 X |
| 4,285,980 | 8/1981 | Lewis | 426/249 |
| 4,379,795 | 4/1983 | Walser | 426/304 |
| 4,399,156 | 8/1983 | Bernal | 426/91 |
| 4,420,494 | 12/1983 | Glantz | 426/441 |
| 4,938,975 | 7/1990 | Waller | 426/91 |

FOREIGN PATENT DOCUMENTS

| | | | |
|---|---|---|---|
| 680486 | 2/1964 | Canada | 426/134 |

OTHER PUBLICATIONS

*Potato Processing*, 4th Edition, William F. Talburt and Ora Smith, eds., Van Nostrand Reinhold Co, pub., New York; pp.: 12, 14, 16, 17–19, 24–26, 308, 310–312, 314–316, 500–502, 506–509, 627–628, 661–662.

*Potato Science and Technology*, G. Lisińska and W. Leszczyński, 1989, Elsevier Science Publishers Ltd, New York; pp. 15, 24–26, 74, 220, 238, 239.

*Potatoes: Production, Storing, Processing*, second edition, Ora Smith, Ph.D. Editor, 1977, Avi Publishing, Westport Connecticut.; pp.: 692–697.

*Primary Examiner*—Arthur L. Corbin
*Attorney, Agent, or Firm*—Ken J. Pedersen; Barbara S. Pedersen

[57] ABSTRACT

Embodiments of a potato-on-a-stick, and methods for making the potato-on-a-stick, are disclosed. The potato-on-a-stick includes a pre-cooked potato, which is prepared by partial baking, an interruption in cooking to cool the potato, and then blanching, which allows a stick to be inserted without breakage of the potato and which causes the potato to adhere to the stick and hold the stick in place in the potato throughout further handling, freezing, thawing, finish-cooking, and eating. In one embodiment, the method of making the potato-on-a-stick product starts with the baking process for potato boats, in which whole potatoes are partially baked, cooled, cut, and scooped-out. The scooped-out potato centers are then blanched and cooled, and a wooden stick is inserted and secured by the adhesiveness of the potato contacting and holding the stick. The invented method produces a potato product which has a secured stick and has an uncrumbly, unbreaking texture and yet a pleasant, soft and palatable texture.

4 Claims, 2 Drawing Sheets

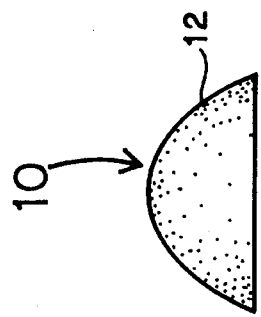
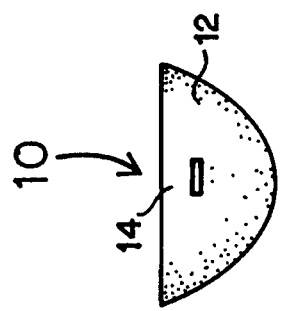
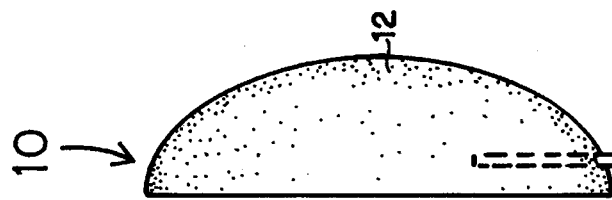
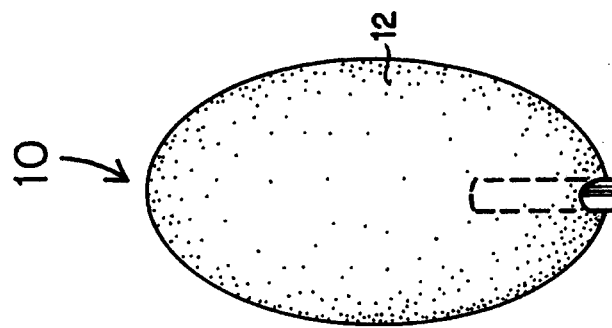
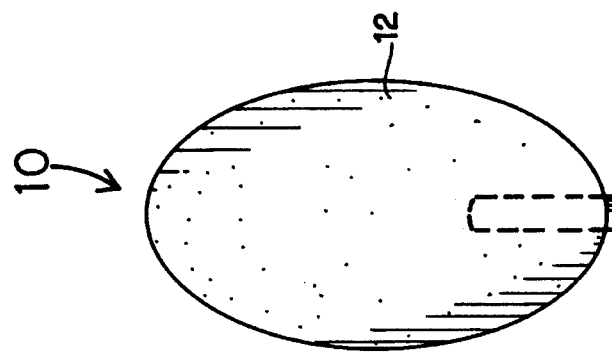

PROCESS FOR PREPARING POTATO PRODUCT WITH SECURED HANDLING STICK

DESCRIPTION

This application is a continuation-in-part of my prior application, Ser. No. 08/191,628, filed Feb. 4, 1994, and entitled "Pre-Cooked Potato On A Stick".

BACKGROUND OF THE INVENTION

1. Field of the Invention.

This invention relates generally to edible potato products, and, more specifically, to a product made by a novel preparation of a potato on a stick.

2. Related Art

Vast quantities of frozen processed potatoes are sold for quick preparation in restaurants, vending carts, and homes. French fries are the most important of the frozen potato products and are supplied for finish-frying in oil or heating by baking or microwave just before serving. French fries are available in the traditional elongated shape and, more recently, in a spiral shape.

Raw french fries are typically blanched after cutting and before frying. This blanching is usually accomplished as a hot water blanching and has the effects of destroying enzymes and enzyme activity and the reduction of sugars and other chemical constituents responsible for the production of off-colors and flavors. The usual range of water temperature for blanching is about 140°–180° F. Hot water blanching results in the removal of water-soluble reducing sugars which are responsible for the coloring of the fried product. Hot water blanching also results in some partial cooking of the french fry potatoes.

"Cooking" is the means by which the raw starches, usually constituting between about 65%–80% of the dry weight of the potato, are converted into more readily-digestible starches, such as amylose and amylopectin. In the raw potato, raw starches are contained within starch granules, held within the plant cells. As the cellular structure is heated during cooking, particularly in the presence of heated water, the starch granules swell and may rupture the cell walls. The starch granules themselves may rupture, resulting in free starches being distributed outside cell walls throughout the cooked product. As a potato is cooled, the starches may gelatinize and restore some firmness to the cooked product.

Baking a potato results in cooking or partial cooking in a much dryer environment than blanching, since it does not surround the potato in a bath of water. Whereas blanching removes water-soluble constituents from the potato, baking tends to cook without removing water-soluble constituents, but does remove water. A baked potato is softer, more mealy, less crisp and more tender than the potato which is blanched or fried.

Skin-on potato boats, or "potato skins", are also a popular restaurant food item. Glantz (U.S. Pat. No. 4,420,494) discloses a potato boat processing method wherein a whole potato is blanched until the outer potato layer just under the skin is gelatinized. The potato is then cut in half longitudinally, and the ungelatinized center or heart of the potato is removed by scooping or abrasion. The scooping or abrasion of the heart leaves a boat-shaped potato piece. The potato boat is reconstituted in restaurants by broiling, baking, or frying and then is served with fillings such as cheese, sour cream, and salsa. Glantz also discloses that potato boats have been prepared by baking and cutting whole potatoes and then scooping out the center.

Veale (Canadian Patent 680,486) discloses a potato product that is made by cutting or grooving a potato to form a plurality of substantially parallel slices attached to and radiating from the core of the potato. The cut potato is cooked in a suitable edible fat or oil and the resultant potato product is eaten, preferably on a stick.

SUMMARY OF THE INVENTION

An object of the present invention is to provide a convenient, and portable potato product, which is fun and easy to handle and eat without a mess. Another object is to provide a potato product that is attractive and easy to prepare for sale by fast-food restaurants or fair and sports vendors, and that is natural and nutritious. In addition, the invented product may utilize a portion of a potato, the scooped-out center, that is a sometimes-wasted by-product of potato boat preparation.

The present invention is a potato-on-a-stick that is made by a novel process that secures the stick into the potato and that also provides a desirable consistency and texture, that is, a texture that preserves the integrity of the potato (firm enough to be non-breaking and non-crumbly) but that is soft enough to be palatable and tasty. This type of texture is called herein a "cohesive yet soft" texture. A potato, which may be a whole potato or a piece or portion of a potato, is partially cooked by baking, is cooled for a period of time, and then is further cooked by blanching. After these steps, a stick may be inserted into the potato without breaking the potato, and the potato adheres to the stick and the stick stays in the potato through further handling, including freezing, heating, finish-cooking in the restaurant, serving, and eating. Freezing is not necessary to make the stick stay in the potato.

The type, sequencing, and extent of the cooking steps of the method of making the potato-on-a-stick give the surprising result that the stick is fixed in the potato, making the potato-on-a-stick conveniently and reliably a single-piece unit. Also, the method results in a cohesive yet soft texture for the entire potato product, and especially for the outer potato surface, which makes the product desirable in all areas: handling, storage, appearance, finish-cooking, and eating.

BRIEF DESCRIPTION OF THE DRAWINGS

FIG. 2 is a front view of the embodiment of FIG. 1.

FIG. 3 is a back view of the embodiment of FIG. 1.

FIG. 4 is a right side view of the embodiment of FIG. 1.

FIG. 5 is a top view of the embodiment of FIG. 1.

FIG. 6 is a bottom view of the embodiment of FIG. 1.

DETAILED DESCRIPTION OF THE PREFERRED EMBODIMENT

Figure 1:
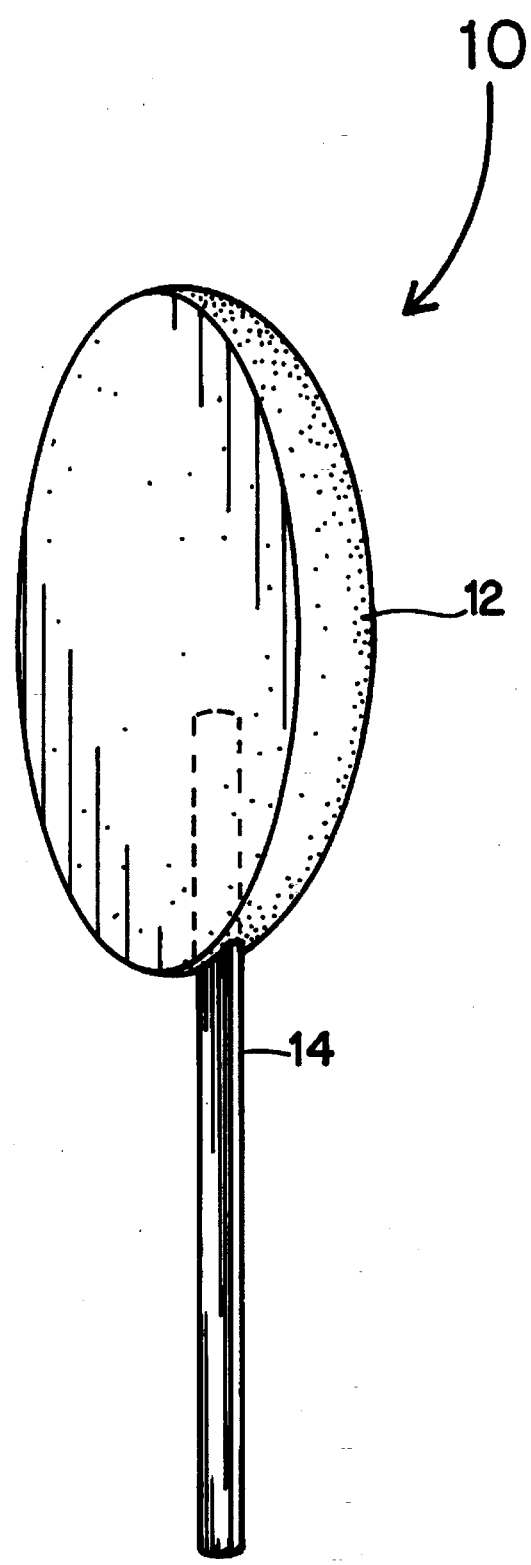
FIG. 1 is a perspective view of one embodiment of the invented potato-on-a-stick.

Referring to Figures, there is shown one, but not the only, embodiment of the invented potato-on-a-stick. The preferred potato on-a-stick 10 includes a potato 12 that is derived from a heart or center of a whole potato that is scooped out in order to make a skin-on potato boat. A stick 14 is inserted into the potato 12. The potato 12 adheres to the stick 14 at the potato-stick interface, so that the stick stays in the potato 12, even without freezing, for further handling, including storage, finish-cooking or heating, serving, or eating. The terms "staying", "stays in the potato", and "stays in place" mean that the potato 12 does not fall off of the stick 14 during handling, freezing, finish-cooking, or eating, i.e., the potato-on-a-stick 10 may be held upside down by the stick 14 only, without the potato 12 falling off of the stick 14.

The method for making the potato-on-a-stick 10 includes a novel sequence of cooking steps which lead to the surprising results of the stick staying in place in the potato and the cohesive yet soft texture throughout the potato 12. This texture keeps the potato 12 from crumbling, flaking, or breaking through freezing and finish-cooking or reconstituting steps and yet is soft enough to result in a tasty and pleasant-textured end product that is so important to snack, fast-food, and restaurant businesses.

The raw potato, either whole or a portion, unpeeled or peeled, is partially baked. By "baking" is meant a cooking process in which the potato is heated in a low moisture environment resulting in loss of moisture from the potato, such as baking in a continuous feed, vented, gas-fired oven. By "partially baked" is meant that the core of the potato is partly or nearly, but preferably not fully, cooked, that is, the potato is baked to the point where the potato core reaches a temperature of about 150°–170° F., and preferably about 160°–165° F.

The cooking process is then interrupted by a cooling step, in which the potato is cooled for preferably at least 20 minutes. This step is important for making the stick stay in the potato, and is believed to affect the adhesiveness of the potato onto the stick.

The potato is then blanched in water, or another high-moisture environment, meaning that moisture is added to the potato during the blanching cooking step.

After blanching and preferably another cooling step, the stick is inserted into preferably the middle or near middle of the potato 12. As a result of the invented process, the potato does not break apart when the stick is inserted, and the potato adheres to the stick to hold the stick in place, even without freezing. Also as a result of the invented process, the potato 12 texture is cohesive and yet soft: the potato 12 does not break apart when the stick is inserted, and the outer layer of the potato 12 is unflaky and uncrumbly, and yet the outer potato layer and the entire potato is soft enough to be palatable and pleasant.

Optionally, an outer layer of the potato may be cut off of the potato. This "cutting off" may include, for example, peeling the potato, cutting or abrading off a significant part of the outer potato, or removing the outer potato by scooping out the center or core of the potato.

The preferred potato 12 may be derived from a by-product of the process for making skin-on potato boats. After washing, inspection and sorting of raw potatoes, a whole raw potato is partially baked, to cook the outer layer of potato and to cook the core or middle of the potato to a core temperature of about 150°–170° F., and preferably about 160°–165° F. By "core temperature" is meant the temperature read by a conventional temperature-sensor probe that is inserted into the middle of the whole or piece of potato being cooked. The baking step is preferably done in a 350°–360° F. oven for about 38 minutes.

After baking, the whole potato is typically cooled in an ambient-air cooler to reduce the potato temperature. The potato is typically cooled until the core temperature is about 90° F. –125° F. Preferably, the potato is cooled for at least 20 minutes or, alternatively, may be cooled as much as several hours, in which time the core temperature drops to ambient. This cooling step provides an interruption in the cooking steps, during which the cooling is believed to "set" or "gel" constituents in the potato that later help in holding the stick inside the potato.

The potato is then cut longitudinally into two halves and the center is scooped out of each half, by a spoon-like implement or machine, to create two skin-on potato boats and two skin-less centers. The centers are each a single unit or chunk generally of the shape shown in FIGS. 1–6.

The centers are then further cooked by blanching in 140°–185° F. water, for about 10–22 minutes and preferably approximately 18–22 minutes. The preferred blanching temperature is about 175°–185° F., for a preferred core temperature above 170° F, or about 175°–185° F. After blanching, the centers are partially cooled in a water-chiller, preferably to a core temperature in the range of about 50°–70° F. or preferably about 55° F.

After the water-chiller cooling, a stick is inserted into each potato center. The stick goes into the center without breaking the potato, and the stick is secured into, or stays in the potato, because of the potato adhering to the stick. In effect, the potato acts adhesively to secure the stick through further handling, reconstitution, and eating.

The potato-on-a-stick may then be frozen, preferably at –30° to 10° F. for about 15–30 minutes, and then at less than 20° F. for about 20 minutes.

After storage and distribution to restaurants or homes, the potato-on-a-stick may be reconstituted or "finish-cooked", for example, by frying in 360°–375° F. oil for about 3–4 minutes, or by baking or pan-frying. Although the potato-on-a-stick may be considered precooked after the baking and blanching steps, the taste of the final product is optimum after a short period of finish-cooking, such as the 3–4 minute frying of the frozen product, and is then regarded as fully-cooked for consumption.

The preferred process, involving centers derived from the potato boat process, has been successful with russet-type potatoes, such as Idaho russet potatoes or Norkota™ burbank russets. Typically, the preferred potatoes are about 3.75–4.75 inches long and about 2–2.5 inches in diameter.

Instead of a scooped-out center, as illustrated in the preferred embodiment and method, other parts or shapes of potatoes may be used, including a whole potato, peeled or unpeeled. For example, a whole potato may be cut longitudinally into four long pieces, so that each piece has both a skin-on side and cut, white sides. Alternatively, unique shapes such as balls, squares, or pyramids could be used for novelty or for special marketing programs. Thus, the potato 12 of the potato-on-a-stick 10 is not limited to the center resulting from a potato-boat processing scheme, but may be other pieces, portions, or whole potatoes, even multiple pieces or potatoes on a single stick or multiple sticks in a single potato.

The invented method ("Method 1" below) produces a superior potato-on-a-stick, both in terms of securing the stick into the potato and producing a desirable potato texture, compared to four other potato cooking methods ("Methods 2–5") illustrated below:

1) Invented Method:

Idaho russet potatoes were prepared as follows:
Bake raw potato to 160°–165° F. core temperature;
Cool to <125° F. core temperature for >20 minutes;

Blanch in water to 175°–185° F. core temperature; and

Insert stick into potato.

Then, the potatoes were tested for stick adhesion after they had cooled to room temperature by holding them upside down and gently bouncing and shaking them. If less than 5% of the potatoes tested this way fell off the stick during the test, the result was considered positive—the stick stays in the potato. It was noted during the testing that generally, if the stick stayed in the potato when it first cooled to room temperature, the stick also stayed in when that potato was later frozen, frozen and thawed, frozen and finish-cooked, or frozen, thawed, and finish-cooked.

Also, the potatoes were observed for texture. If the potato is too hard or too soft, it may be brittle or crumbly and will break or split while the stick is being inserted. If the potato or its outer surface is too flaky or crumbly, the potato will be unacceptable or unpleasant for handling, finish-cooking, and eating. Or, if the potato is too hard or toughened, either on the outer surface or throughout the potato, it will be unpalatable, even after finish-cooking or reconstitution. So, if more than 5% of the potatoes tested had occurrences of breakage, crumbling or flaking, the result was considered negative.

Results:

Stick Adhesion: stick stays in the potato

Potato Texture: no breakage, no crumbling, no flaking

2) Blanching Only Method:

Idaho russet potatoes were also prepared as follows:

Blanch raw potato in water to 175°–185° F. core temperature;

Cool to <125° F. core temperature for >20 minutes;

Insert stick into potato.

Then the potatoes were tested for stick adhesion and potato texture as described above in Method 1.

Results:

Stick Adhesion: stick comes out

Potato Texture: breakage, crumbling

3) Baking Only Method:

Idaho russet potatoes were also prepared as follows:

Bake raw potato to 175°–185° F. core temperature;

Cool to <125° F. core temperature for >20 minutes;

Insert stick into potato.

Then the potatoes were tested for stick adhesion and potato texture as described above in Method 1.

Results:

Stick Adhesion: stick comes out

Potato Texture: flaking, crumbling

4) Baking followed by Blanching Method (without cooling interruption in between):

Idaho russet potatoes were also prepared as follows:

Bake raw potato to 160°–165° F. core temperature;

Blanch in water to 175°–185° F. core temperature;

Cool to <125° F. core temperature for >20 minutes;

Insert stick into potato.

Then the potatoes were tested for stick adhesion and potato texture as described above in Method 1.

Results:

Stick Adhesion: stick comes out

Potato Texture: no breakage, no crumbling, no flaking

5) Blanching followed by Baking Method (without cooling interruption):

Idaho russet potatoes were also prepared as follows:

Blanch raw potato in water to 160°–165° F. core temperature;

Bake to 175°–185° F. core temperature;

Cool to <125° F. core temperature for >20 minutes;

Insert stick into potato.

Then the potatoes were tested for stick adhesion and potato texture as described above in Method 1.

Results:

Stick Adhesion: stick comes out

Potato Texture: tough, unpalatable

Thus, it can be seen by the above examples, that the invented baking, cooling, blanching method is required for the desired qualities of good potato-on-stick adhesion and the cohesive yet soft texture that preserves potato integrity and palatability. Switching the order of baking and blanching produced an inferior texture. Eliminating the cooling step between baking and blanching gives inferior potato-on-stick adhesion. Cooking by baking or blanching only produces both poor potato-on-stick adhesion and poor texture.

Although this invention has been described above with reference to particular means, materials, dimensions, and embodiments, it is to be understood that the invention is not limited to these disclosed particulars, but extends instead to all equivalents within the scope of the following claims.

I claim:

1. A method of making a potato-on-a-stick food product comprising:

a) partially baking a potato until the potato core temperature is about 150°–170° F.;

b) cooling the partially baked potato to a core temperature of less than about 125° F.;

c) blanching the cooled potato until the potato core temperature is about 170°–185° F.; and then;

d) inserting a stick into the blanched potato;

wherein the potato adheres to the stick and the stick stays in the potato, and wherein the baked and blanched potato has a cohesive, yet soft texture.

2. A method of claim 1, wherein the cooling step continues for at least 20 minutes.

3. A method of claim 1, further comprising cutting off an outer layer of the potato.

4. A method of claim 1, further comprising cutting off an outer layer of the potato between the baking step and the blanching step.

\* \* \* \* \*